(12) United States Patent
Nonaka et al.

(10) Patent No.: US 10,699,039 B2
(45) Date of Patent: Jun. 30, 2020

(54) WHOLE INTEGRATED ANALYSIS MODEL ASSIST DEVICE AND WHOLE INTEGRATED ANALYSIS MODEL ASSIST METHOD

(71) Applicant: Hitachi, Ltd., Chiyoda-ku, Tokyo (JP)

(72) Inventors: Norihiko Nonaka, Tokyo (JP); Yixiang Feng, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 15/562,927

(22) PCT Filed: Mar. 15, 2016

(86) PCT No.: PCT/JP2016/058088
§ 371 (c)(1),
(2) Date: Sep. 29, 2017

(87) PCT Pub. No.: WO2016/167068
PCT Pub. Date: Oct. 20, 2016

(65) Prior Publication Data
US 2018/0089348 A1 Mar. 29, 2018

(30) Foreign Application Priority Data
Apr. 16, 2015 (JP) .................. 2015-084229

(51) Int. Cl.
*G06F 30/20* (2020.01)
*G06F 30/13* (2020.01)
(Continued)

(52) U.S. Cl.
CPC .............. *G06F 30/20* (2020.01); *G06F 30/13* (2020.01); *G06F 30/15* (2020.01); *G06F 30/17* (2020.01); *Y02P 90/30* (2015.11)

(58) Field of Classification Search
None
See application file for complete search history.

(56) References Cited

U.S. PATENT DOCUMENTS

2002/0133329 A1* 9/2002 Kano ..................... G06F 30/20
703/22
2005/0289497 A1* 12/2005 Matsumoto ........... G06F 30/398
716/111

FOREIGN PATENT DOCUMENTS

JP  2-228576 A  9/1990
JP  2002-259888 A  9/2002
(Continued)

OTHER PUBLICATIONS

Translation of Japanese Patent No. JP4850656B2 publication date Feb. 11, 2012, translation by Google Patents. (Year: 2020).*

(Continued)

*Primary Examiner* — Suzanne Lo
(74) *Attorney, Agent, or Firm* — Crowell & Moring LLP

(57) ABSTRACT

Provided is a technology capable of detecting analysis accuracy and an analysis time of an analysis object system appropriately and objectively. A whole integrated analysis model assist device according to the present invention calculates an analysis prediction time and an analysis prediction accuracy when whole integrated analysis for an analysis object is performed using acquired analysis results corresponding to a plurality of analysis levels of detail of a plurality of components, and outputs the analysis prediction time and the analysis prediction accuracy corresponding to a designated combination of the analysis levels of detail of the plurality of components.

10 Claims, 16 Drawing Sheets

(51) Int. Cl.
    *G06F 30/15*    (2020.01)
    *G06F 30/17*    (2020.01)

(56) References Cited

FOREIGN PATENT DOCUMENTS

| | | | |
|---|---|---|---|
| JP | 2003-162547 A | 6/2003 | |
| JP | 2006-12049 A | 1/2006 | |
| JP | 4850656 B2 * | 1/2012 | ............ G06Q 10/04 |

OTHER PUBLICATIONS

Eom et al. "Speed vs. Accuracy in Simulation for I/O-Intensive Applications", IEEE, Proceedings of IPDPS 2000, May 2000, 8 pages. (Year: 2000).*

International Search Report (PCT/ISA/210) issued in PCT Application No. PCT/JP2016/058088 dated Jun. 14, 2016 with English translation (2 pages).

Japanese-language Written Opinion (PCT/ISA/237) issued in PCT Application No. PCT/JP2016/058088 dated Jun. 14, 2016 (3 pages).

\* cited by examiner

FIG. 2

PHASE 1

[S100: ANALYSIS MODEL INPUT PROCESS]

- DISPLAY ANALYSIS MODEL INPUT SCREEN — S101
- ACQUIRE ANALYSIS MODEL INFORMATION — S102
- INPUT INFORMATION ACQUIRED IN S102 TO DATABASE — S103

[S200: ANALYSIS CONDITION INPUT PROCESS]

- ACQUIRE ALL PIECES OF INFORMATION INPUT IN S100 FROM DATABASE — S201
- DISPLAY ANALYSIS CONDITION INPUT SCREEN — S202
- ACQUIRE ANALYSIS CONDITION INFORMATION — S203
- INPUT INFORMATION ACQUIRED IN S203 TO DATABASE — S204

WHOLE INTEGRATED ANALYSIS MODEL ASSIST DEVICE AND WHOLE INTEGRATED ANALYSIS MODEL ASSIST METHOD

TECHNICAL FIELD

The present invention relates to a whole integrated analysis model assist device and a whole integrated analysis model assist method, and more particularly, to a technique for assisting, for example, whole integrated analysis for an analysis object constituted by a plurality of components.

BACKGROUND ART

Since the past, for example, analysis of calculating performance of mechanical structures has been performed. For example, a method of performing an analysis calculation while switching analysis of a different level of detail in accordance with an analysis condition when an analysis model of a mechanical structure is constructed as in a technique disclosed in Patent Document 1 has been known. In the technique disclosed in Patent Document 1, a model selecting unit selects a simulation model on the basis of a selection condition set from a condition input unit, reads the simulation model from a model database, and a simulation calculating unit performs a simulation calculation on the basis of an initial state and a simulation condition set in the condition input unit using the read simulation model. Accordingly, the simulation calculation is performed while switching the simulation models having different levels of detail on the basis of a model selection condition. For example, a device that performs a simulation with high accuracy on important parts using a model with a high level of detail and performs a simulation on less important parts in a short time using a model having a low level of detail is disclosed.

Further, for example, a method of storing an analysis model in advance, combining an analysis model on the basis of information to be combined, and performing analysis in analysis for the whole system constituting a mechanical structure as in a technique disclosed in Patent Document 2 has been known. A device including a module library storage unit in which circuit information related to a circuit of each substrate module, mounting information related to part mounting, and analysis models used for characteristic analysis are stored in advance, an input unit that receives an instruction related to a connection between modules to realize a desired wiring, a module combining unit that combine the circuit information and the mounting information of the module to be combined with each other on the basis of the input instruction, decides a layout of a wiring board, combines the analysis models of the modules to be combined, and generate a combined analysis model, a characteristic analyzing unit that performs a characteristic analysis for the layout based on the generated combined analysis model, and an output unit that outputs the decided layout and a result of the characteristic analysis generated for each layout is disclosed in Patent Document 2.

CITATION LIST

Patent Document

Patent Document 1: Japanese Laid-Open patent No. 2002-259888

Patent Document 2: Japanese Laid-Open patent No. 2006-12049

SUMMARY OF THE INVENTION

Technical Problem

In the technique disclosed in Patent Document 1, the analysis model is switched in accordance with the analysis condition, a simulation with high accuracy is performed on important parts using a model with a high level of detail, and an analysis calculation is performed on less important parts using a model having a low level of detail. In a case in which such an analysis calculation is performed, for example, an analysis model with a high level of detail such as a three-dimensional finite element method is applied as an analysis model for important parts. On the other hand, for example, an analysis calculation is performed by applying an analysis model with a low level of detail such as a mass system analysis model as an analysis model for less important parts.

However, in the technique disclosed in Patent Document 1, a method of selecting a model for important parts and a model for less important parts is not explicitly described, and the model selection is performed on the basis of experience, intuition, or know-how of an operator. For this reason, in a case in which an originally important parts is determined not to be important, and an analysis model with a low level of detail is used, there is a problem in that the analysis accuracy deteriorates. Further, in a case in which an analysis model for originally unimportant parts is determined to be important, and an analysis model with a high level of detail is used, there is a problem in that an analysis time increases. Therefore, in Patent Document 1, a technique of appropriately determining important parts and less important parts and implementing an improvement in analysis accuracy and a reduction in an analysis time is not sufficiently considered.

In the analysis for the whole system disclosed in Patent Document 2, the analysis models are stored in advance, and the analysis model is constructed by combining the analysis models on the basis of information to be combined.

However, in Patent Document 2, since the validity of the stored analysis models is not explicitly described, the analysis model is not appropriate, and when an analysis model with a high level of detail is stored, there is a problem in that the analysis time increases. Further, when the analysis model with the low level of detail is stored, there is a problem in that the analysis accuracy deteriorates. In other words, even in PTL 2, the technique of appropriately determining the level of detail of the analysis model and implementing an improvement in analysis accuracy and a reduction in an analysis time is not sufficiently considered.

The present invention was made in light of the foregoing, and it is desirable to provide a technique capable of detecting analysis accuracy and an analysis time for an analysis target system appropriately and objectively.

Solution to Problem

In order to solve the above problems, a whole integrated analysis model assist device according to the present invention calculates an analysis prediction time and an analysis prediction accuracy when whole integrated analysis for an analysis object is performed using acquired analysis results corresponding to a plurality of analysis levels of detail of a plurality of components, and outputs the analysis prediction time and the analysis prediction accuracy corresponding to a designated combination of the analysis levels of detail of the plurality of components.

Other features of the present invention will be apparent from description of the present specification and the accompanying drawings. Further, aspects of the present invention are achieved and realized by elements, combinations of various elements, detailed description, and aspects of claims set forth below.

It should be noted that description of the present specification is merely exemplary and not intended to limit claims or application examples of the present invention in any sense.

Advantageous Effects of the Invention

According to the present invention, it is possible to detect the analysis accuracy and the analysis time for the analysis object system appropriately and objectively.

BRIEF DESCRIPTION OF DRAWINGS

FIG. 2 is a flowchart for describing a process (phase 1) according to an embodiment of the present invention.

DESCRIPTION OF EMBODIMENTS

The present invention relates to analysis model accuracy prediction and analysis time prediction method and analysis model selection for a calculation of performance such as efficiency of the whole system of a mechanical structure. An embodiment of the present invention discloses a technique of performing analysis (physical phenomenon analysis: for example, three-dimensional fluid analysis, structural analysis, vibration analysis, thermal analysis, or the like) on each of components constituting an analysis object for each level of detail and objectively predicting accuracy and an analysis time of analysis (integrated analysis) in the whole analysis object on the basis of a result thereof.

Hereinafter, an embodiment of the present invention will be described with reference to the accompanying drawings. In the accompanying drawings, the same functional elements may be denoted by the same number. The accompanying drawings illustrate a specific embodiment and an implementation example according to the principle of the present invention, but the drawings are to facilitate understanding of the present invention and not intended to interpret the present invention in a limited way.

In the present embodiment, the present invention will be sufficiently described so that persons skilled in the art are able to carry out the present invention, but it should be noted that other implementations or forms are also possible, and modifications of a configuration or a structure or replacements of various elements can be made without departing from the scope and spirit of a technical idea of the present invention. Therefore, the following description should not be interpreted to be limited thereto.

Furthermore, as will be described later, an embodiment of the present invention may be carried out by software operating on general-purpose computers or may be carried out by dedicated hardware or a combination of software and hardware.

<Configuration of Whole Integrated Analysis Optimal Model Selection System>

Figure 1:
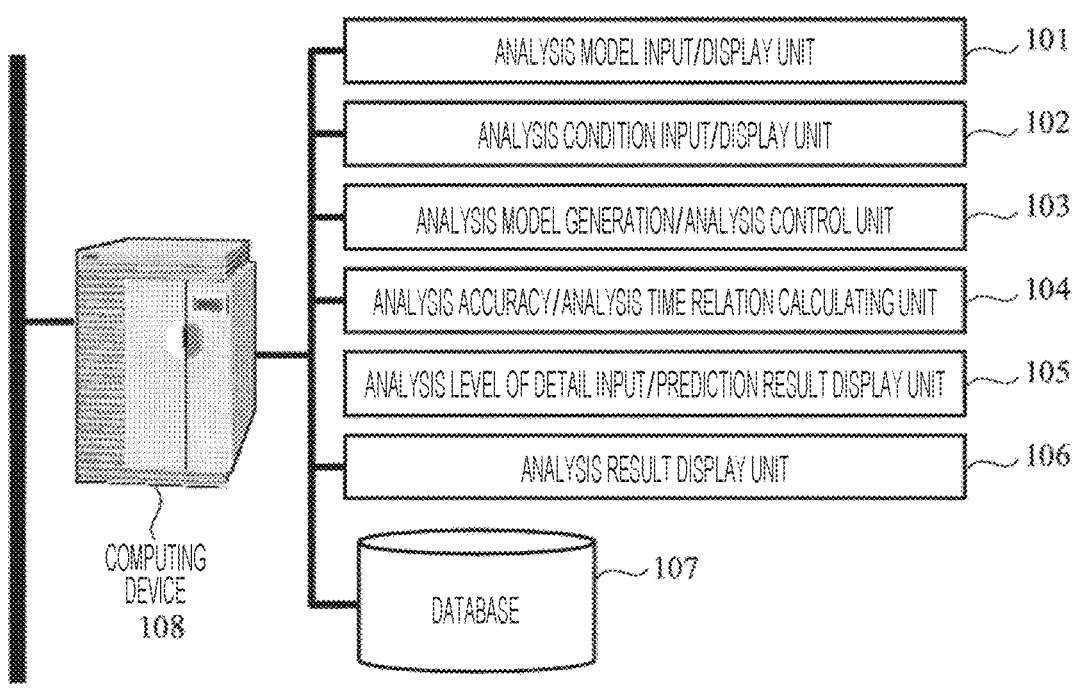
FIG. 1 is a diagram illustrating a schematic configuration example of a whole integrated analysis optimal model selection system (a whole integrated analysis model assist system) according to an embodiment of the present invention.

FIG. 1 is a diagram illustrating a schematic configuration example of a whole integrated analysis optimal model selection system (a whole integrated analysis model assist system) according to an embodiment of the present invention. The whole integrated analysis optimal model selection system includes an analysis model input/display unit 101, an analysis condition input/display unit 102, an analysis model generation/analysis control unit 103, an analysis accuracy/analysis time relation calculating unit 104, an analysis level of detail input/prediction result display unit 105, an analysis result display unit 106, a database 107, and a computer 108. Each of the processing units 101 to 106 is configured as a program, and for example, each program may be stored in a program memory, or each of the processing units 101 to 106 may be configured as a module. In a case in which each processing unit is configured as a program, the computer (processor) 108 reads a necessary program from the program memory, develops the program onto a memory, and executes each program. In FIG. 1, the database 107 is installed in one device, but the present invention is not limited to this aspect, but the database 107 may be installed in a storage device or a cloud storage system which is remotely provided via a network. In the following description, components of an analysis target system are assumed not to be registered in the database 107. However, the components of the analysis target system may be already stored in the database 107, and the operator may select necessary components from among the stored components.

An analysis condition or an analysis model may be similarly selected from among the analysis conditions or the analysis models which are registered in advance.

The analysis model input/display unit 101 displays an analysis model input screen. The operator inputs an analysis model, an analysis level of detail, an analysis type, and the like of a component using the analysis model input screen. Then, the analysis model input/display unit 101 causes the input analysis model information to be displayed on the input screen and further inputs the input information to the database 107.

The analysis condition input/display unit 102 displays an analysis condition input screen. The operator inputs an inlet boundary condition, an outlet boundary condition, an analysis condition, and conditions of a main variable and a dependent variable for the analysis model of the component input through the analysis model input/display unit 101 using the analysis condition input screen. Then, the analysis condition input/display unit 102 causes the input analysis condition information to be displayed on the input screen and inputs the input information to the database 107.

The analysis model generation/analysis control unit 103 acquires the information input by the analysis model input/display unit 101 and the analysis condition input/display unit 102 from the database 107. For each component, an analysis model is generated for each analysis level of detail. The analysis model is mesh-generated as necessary. Further, the analysis model generation/analysis control unit 103 performs analysis (physical phenomenon analysis mentioned above) on all the analysis levels of detail and all the components under the analysis condition input through the analysis condition input/display unit 102. When the analysis is completed, the analysis model generation/analysis control unit 103 inputs analysis results for each component to the database 107. Furthermore, the analysis model generation/analysis control unit 103 constructs an analysis model in which a plurality of analysis regions are connected using the analysis model input through the analysis model input/display unit 101 on the basis of the information of the analysis level of detail input through the analysis level of detail input/prediction result display unit 105. The analysis model is mesh-generated as necessary. Then, the analysis model generation/analysis control unit 103 executes the analysis under the analysis condition input through the analysis condition input/display unit 102 and inputs an analysis result to the database 107.

The analysis accuracy/analysis time relation calculating unit 104 acquires the analysis results obtained by performing the analysis through the analysis model generation/analysis control unit 103 and calculates a difference of analysis results of different analysis levels of detail for the same component. Further, the analysis accuracy/analysis time relation calculating unit 104 calculates the differences of analysis results of different analysis levels of detail for all components, and performs a multi-objective optimization calculation in which the analysis level of detail of the component is used as a design variable, and a difference and an analysis time is used as an objective function. Then, the difference and a result of the multi-objective optimization calculation are input to the database 107.

The analysis level of detail input/prediction result display unit 105 acquires the information input through the analysis model input/display unit 101, the analysis condition input/display unit 102, the analysis model generation/analysis control unit 103, and the analysis accuracy/analysis time relation calculating unit 104, and displays the analysis level of detail input/prediction result display screen. When the operator inputs the analysis level of detail of each component, the analysis level of detail input/prediction result display unit 105 displays a prediction time (a prediction result for the analysis time) and prediction accuracy (a prediction result for the analysis accuracy), and displays results obtained by the multi-objective optimization calculation performed by the analysis accuracy/analysis time relation calculating unit 104. Then, when the operator selects one of the results obtained by the multi-objective optimization calculation, the analysis level of detail input/prediction result display unit 105 displays the prediction time and the prediction accuracy corresponding to the selected result. Further, the analysis level of detail input/prediction result display unit 105 gives an instruction to perform generation of the analysis model in which a plurality of analysis regions are connected and execution of the analysis to the analysis model generation/analysis control unit 103 on the basis of the analysis level of detail of each component set by the operator, and inputs the analysis result to database 107.

The analysis result display unit 106 acquires the analysis result analyzed by the analysis model generation/analysis control unit 103 from the database 107 and presents the analysis result to the operator. A display form may be a form in which it is displayed on the display screen, a form in which it is printed through a printer, or the like.

The database 107 accumulates data obtained by the analysis model input/display unit 101, the analysis condition input/display unit 102, the analysis model generation/analysis control unit 103, the analysis accuracy/analysis time relation calculating unit 104, the analysis level of detail input/prediction result display unit 105, and the analysis result display unit 106.

<Detailed Operation of Whole Integrated Analysis Optimal Model Selection System>

Figure 3:
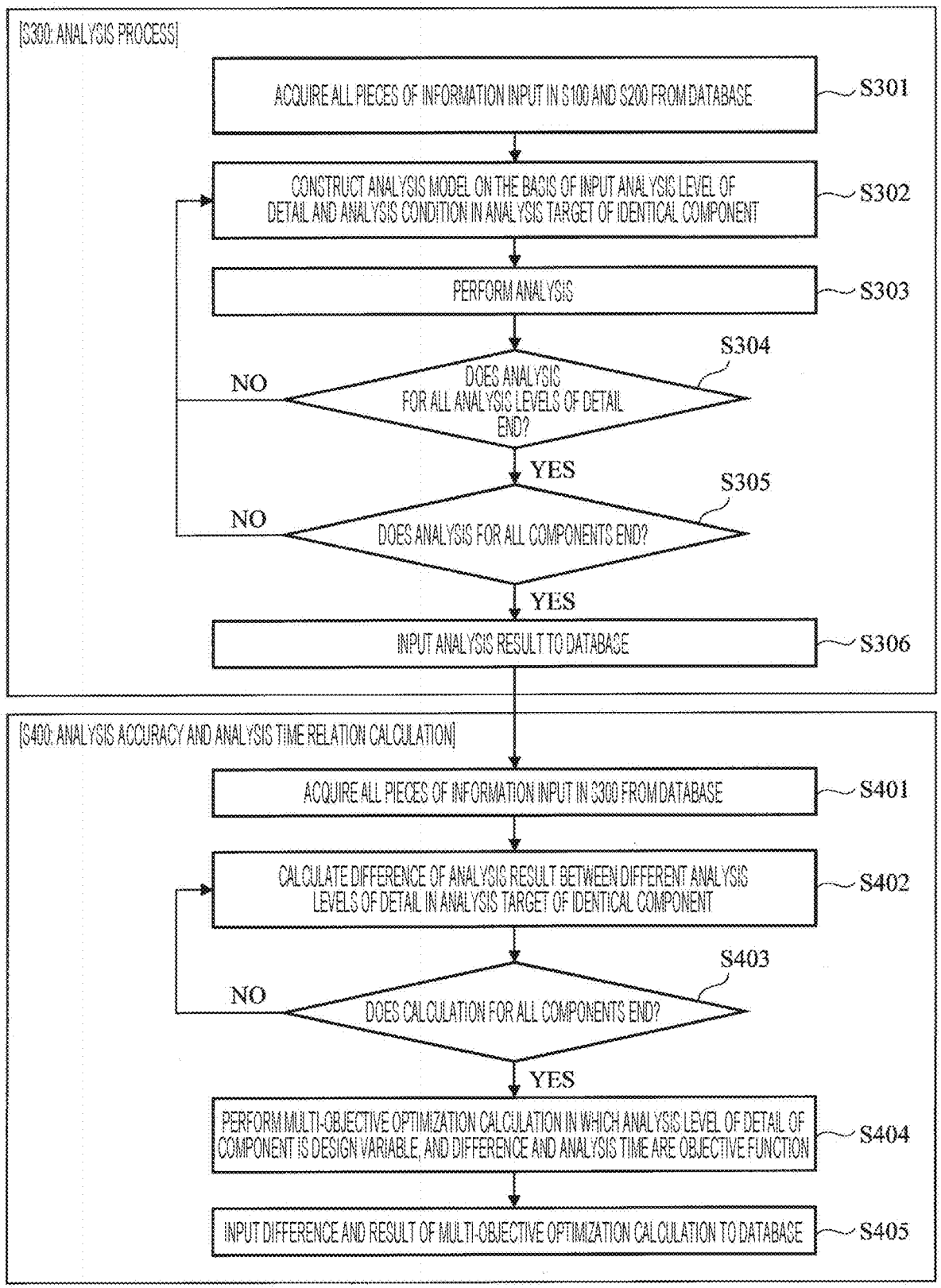
FIG. 3 is a flowchart for describing a process (phase 2) according to an embodiment of the present invention.
Figure 4:
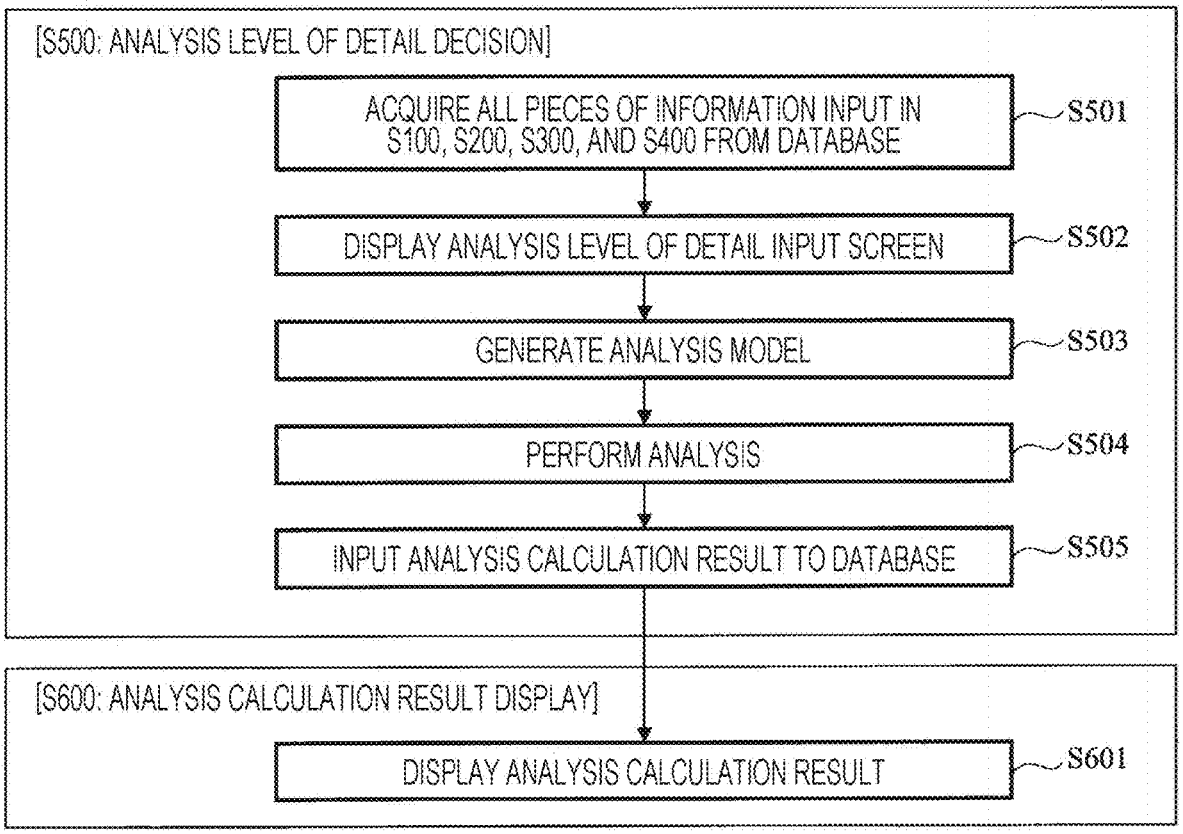
FIG. 4 is a flowchart for describing a process (phase 3) according to an embodiment of the present invention.

An operation of the whole integrated analysis optimal model selection system having the above configuration will be described with reference to FIGS. 2 to 18. FIGS. 2, 3, and 4 are flowcharts for describing processing content in the whole integrated analysis optimal model selection system illustrated in FIG. 1. A procedure of the present invention is roughly divided into three phases. A first phase is a phase in which the analysis model and the analysis condition are input. A second phase is a phase in which an analysis calculation for predicting performance such as the analysis accuracy and the analysis time is performed, and the performance such as the analysis accuracy and the analysis time is calculated. A third phase is a phase in which the analysis level of detail is input, the calculation accuracy and the analysis time to be predicted are calculated, the analysis model is constructed in accordance with the input level of detail, the analysis is performed, and the analysis result is displayed.

(A) Phase 1

Figure 5:
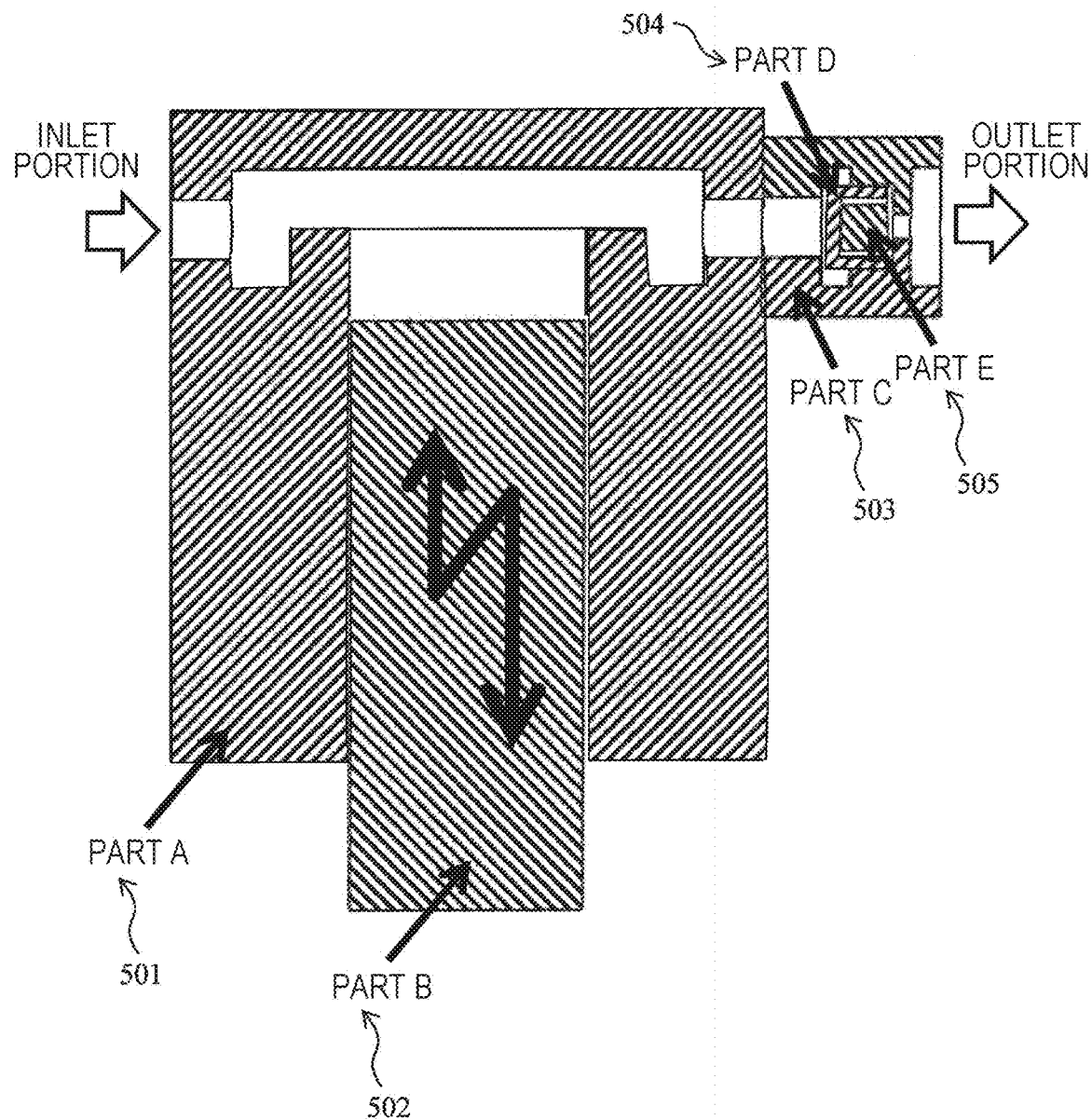
FIG. 5 is a diagram illustrating an example of a mechanical structure.

FIG. 5 is a diagram illustrating an example of a mechanical structure to which an embodiment of the present invention can be applied. A method for predicting the analysis accuracy and the analysis time of the whole integrated analysis will be described from the phase 1 with reference to FIG. 5. FIG. 5 is a cross-sectional view of a fluid pump serving as a mechanical structure, and the mechanical structure of FIG. 5 is an assembly configured with five parts, a part A 501, a part B 502, a part C 503, a part D 504, and a part E 505. In the fluid pump, the part B called a plunger moves up and down. Further, a blank part of the fluid pump is filled with a fluid, and the fluid flows in through an inlet portion when the plunger (the part B) moves down, and the pressure inside the pump decreases. When the plunger (the part B) moves up from a bottom dead center, the pressure increases, and a valve at the end of the inlet portion is closed.

Furthermore, when the plunger (the part B) moves up, the pressure inside the pump increases, a valve of the part D called a delivery valve is opened, and thus the fluid flows out through an outlet portion. When the plunger (the part B) moves down from the top dead center again, the pressure drops, and the delivery valve (the part D) is closed. The valve is pressurized by a spring (the part E) and is opened or closed in accordance with the increase or decrease in the pressure inside the pump.

A method of predicting the analysis accuracy and the analysis time for the fluid analysis for whole integrated analysis in which two analysis regions, that is, a compressing chamber of a flow path portion indicated by blank portions including the parts A and B and a flow path portion of the delivery valve including the parts C, D, and E, are connected will be described.

FIG. 2 is a flowchart for describing an analysis model input process (S100) and an analysis condition input process (S200) in an embodiment of the present invention.

(i) Step 101

Figure 6:
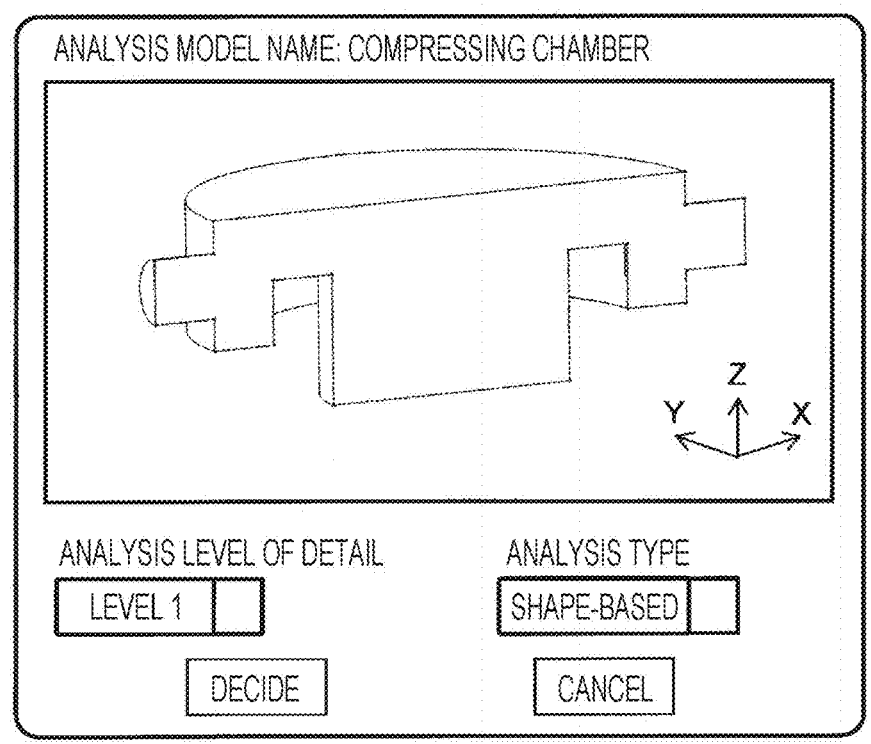
FIG. 6 is a diagram illustrating an example of an analysis model input screen (1/6).

The analysis model input/display unit 101 first displays the analysis model input screen. FIG. 6 is a diagram illustrating a configuration example of an input screen for a level of detail 1 of a first analysis model (compressing chamber). The operator inputs the analysis model to be analyzed through the input screen. For example, the analysis model may be input through CAD data. Here, the flow path portion which is a three-dimensional model of the compressing chamber is input. "Compressing chamber" is input as an analysis model name, and "level 1" indicating the highest level of detail is input as an analysis level of detail. Since the three-dimensional model is a object, the analysis level of detail is set to the level 1. Further, since the analysis model has a shape, "shape-based" is input as an analysis type.

Figure 7:
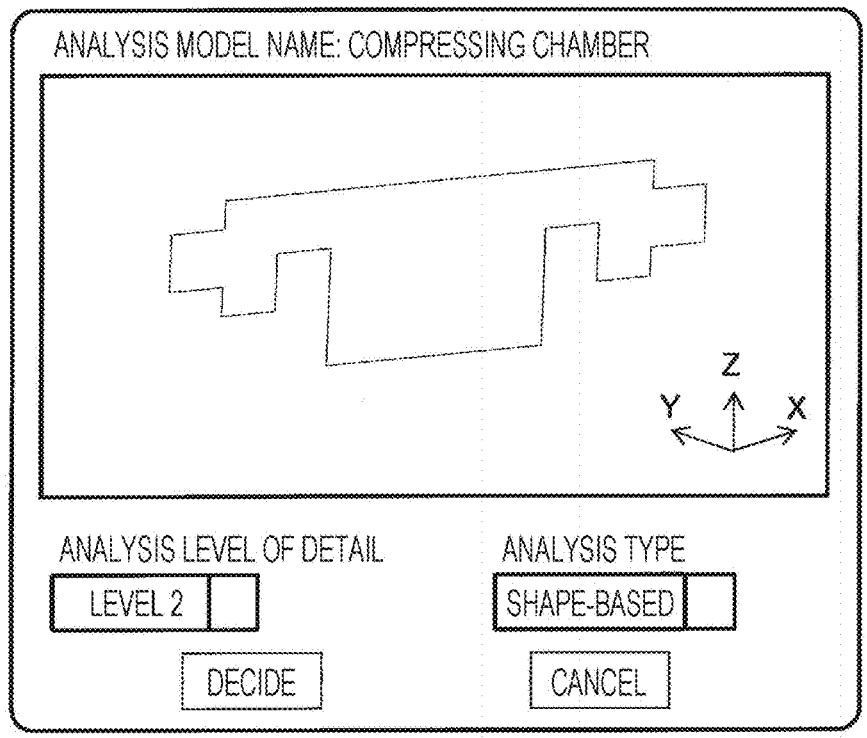
FIG. 7 is a diagram illustrating an example of an analysis model input screen (2/6).

Then, the operator inputs an analysis model with a low analysis level of detail. FIG. 7 is a diagram illustrating a configuration example of an input screen for a level of detail 2 of the first analysis model (compressing chamber). Here, a two-dimensional model of the "compressing chamber" is input. Similarly, "compressing chamber" is input as the analysis model name, and "level 2" indicating a next analysis level of detail of the level 1 is input as the analysis level of detail. Further, since the analysis model has a shape, "shape-based" is input as the analysis type.

Figure 8:
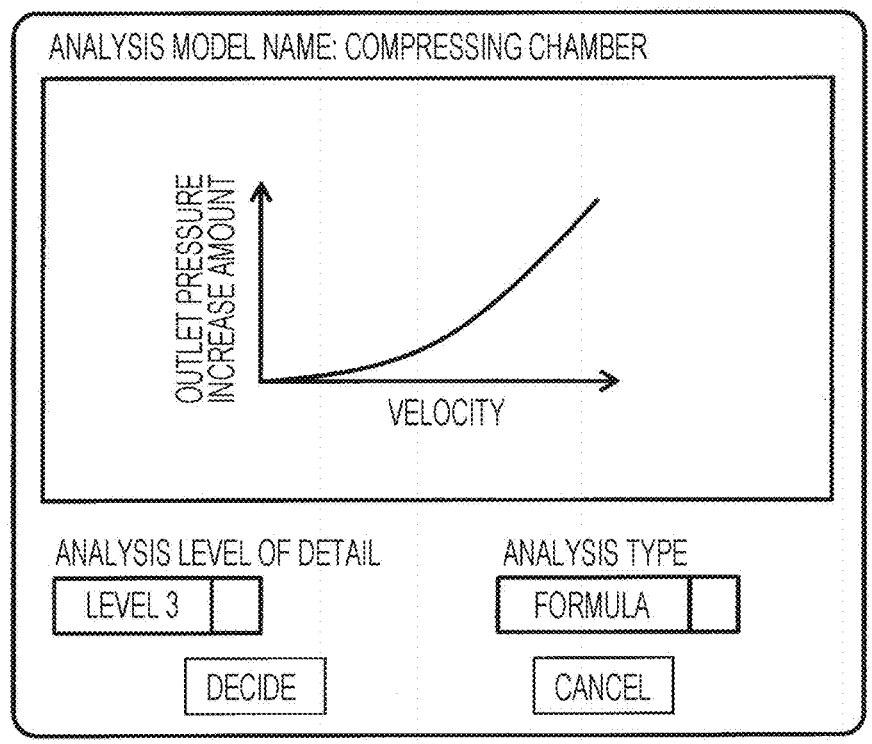
FIG. 8 is a diagram illustrating an example of an analysis model input screen (3/6).

Further, the operator inputs an analysis model with the lowest analysis level of detail. FIG. 8 is a diagram illustrating a configuration example of an input screen for a level of detail 3 of the first analysis model (compressing chamber). Here, a relation between a velocity of the plunger and a pressure increase amount of the outlet portion is input (it may be input through a mathematical formula, or individual data may be input through a table), and the distribution thereof is displayed as the analysis model. Similarly, "compressing chamber" is input as the analysis model name, and "level 3" indicating the lowest analysis level of detail is input as the analysis level of detail. Further, since the analysis model does not have a shape, "formula" is input as the analysis type.

Figure 9:
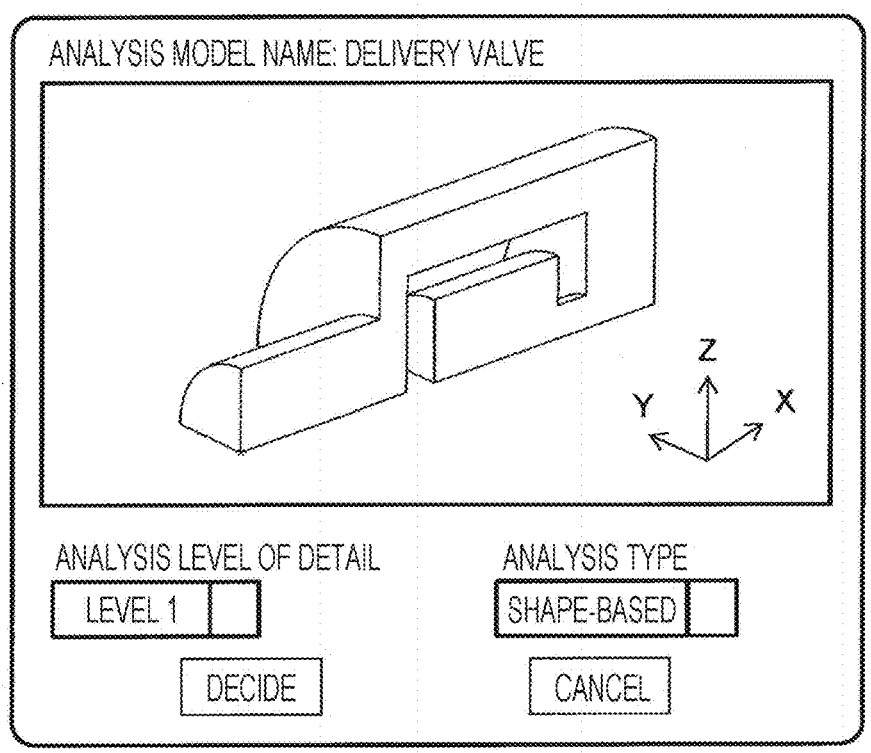
FIG. 9 is a diagram illustrating an example of an analysis model input screen (4/6).

Similarly, the operator also inputs the analysis model of the delivery valve. First, an analysis model with the highest analysis level of detail is input. FIG. 9 is a diagram illustrating a configuration example of an input screen for a level of detail 1 of a second analysis model (delivery valve). Here, a flow path portion which is a three-dimensional model of the delivery valve is input. "Delivery valve" is input as the analysis model name, and "level 1" is input as the analysis level of detail since it is the three-dimensional model. Further, "shape-based" is input as the analysis type.

Figure 10:
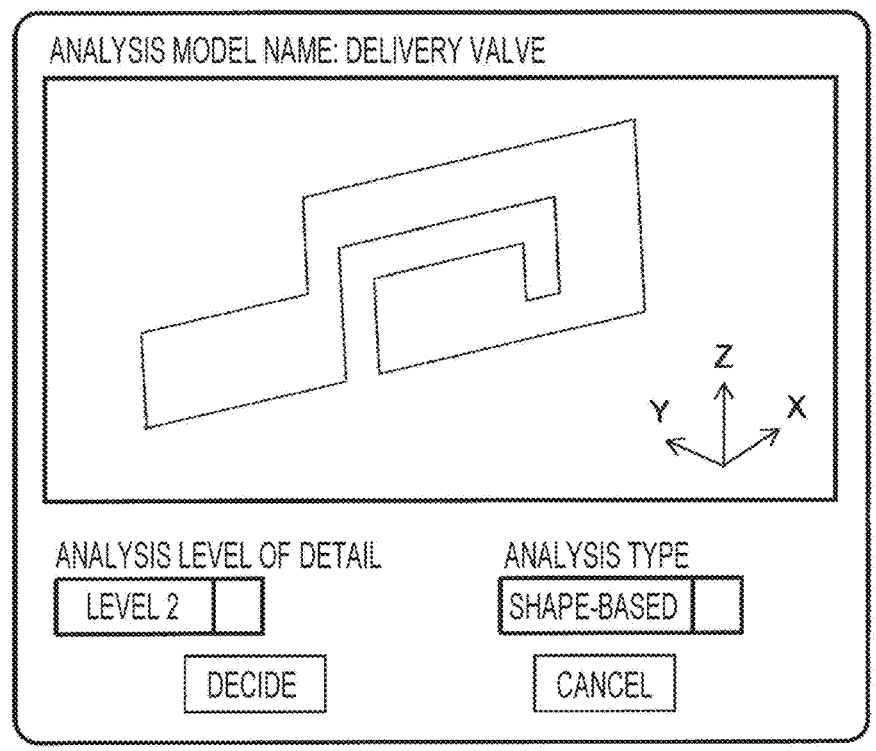
FIG. 10 is a diagram illustrating an example of an analysis model input screen (5/6).

The operator inputs an analysis model with the next highest analysis level of detail. FIG. 10 is a diagram illustrating a configuration example of an input screen for a level of detail 2 of the second analysis model (delivery valve). Here, a flow path portion which is a two-dimensional model of the delivery valve is input. "Delivery valve" is input as the analysis model name, and "level 2" is input as the analysis level of detail. Further, "shape-based" is input as the analysis type.

Figure 11:
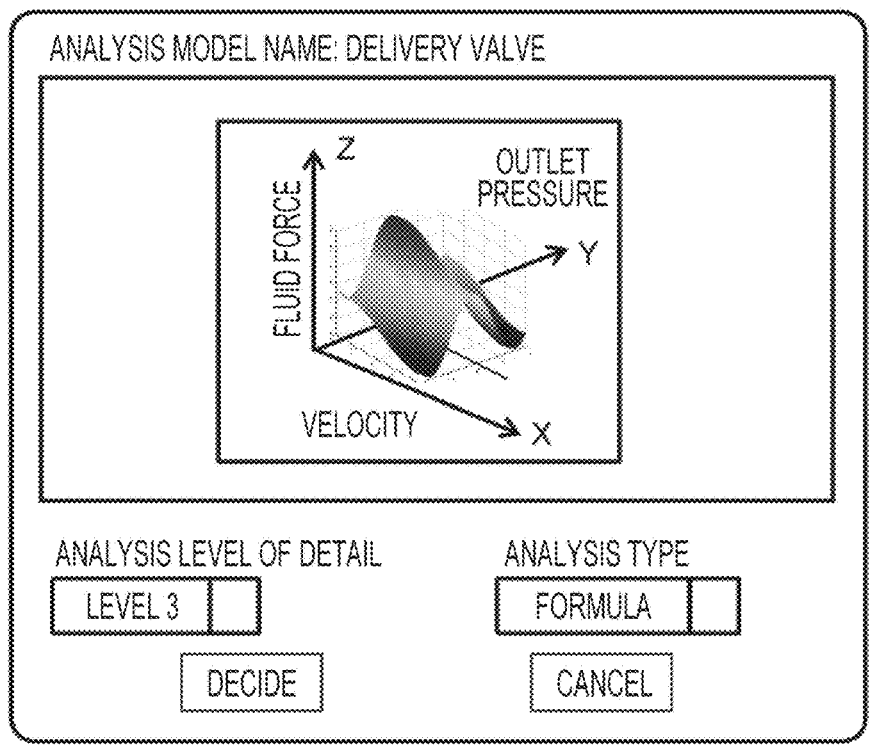
FIG. 11 is a diagram illustrating an example of an analysis model input screen (6/6).

The operator finally inputs an analysis model with the lowest analysis level of detail. FIG. 11 is a diagram illustrating a configuration example of an input screen for a level of detail 3 of the second analysis model (delivery valve). Here, a polynomial indicated by the following Formula (1) is input as a behavior of the delivery valve, and the distribution thereof is input as the analysis model. "Delivery valve" is input as the analysis model name, and "level 3" is input as the analysis level of detail since it is an approximation formula. Further, since the analysis model does not have a shape, "formula" is input as the analysis type.

[Math. 1]

$$Z=a+bx+cy+dxy+ex^2+fy^2+gx^2y+hxy^2+ix^2y^2 \tag{1}$$

An order in which the analysis models are input in S101 is a random order. Further, the three levels 1, 2, and 3 are employed as the analysis level of detail, but the level may be increased to a level 4 or a level 5 in view of complexity of analysis such as steady analysis (analysis of a state that does not change), unsteady analysis (analysis of a state that changes over time), and coupled analysis (analysis of two or more states).

(ii) Step 102

The analysis model input/display unit 101 acquires information of the analysis model names, the analysis models, the analysis levels of detail, and the analysis types of the pump room and the delivery valve input in S101.

(iii) Step 103

The analysis model input/display unit 101 inputs the information obtained in S102 into the database 107. The processing contents of S100 have been described above.

(iv) Step 201

The analysis condition input/display unit 102 acquires the information input by the analysis model input/display unit 101 from the database 107.

(v) Step 202

Figure 12:
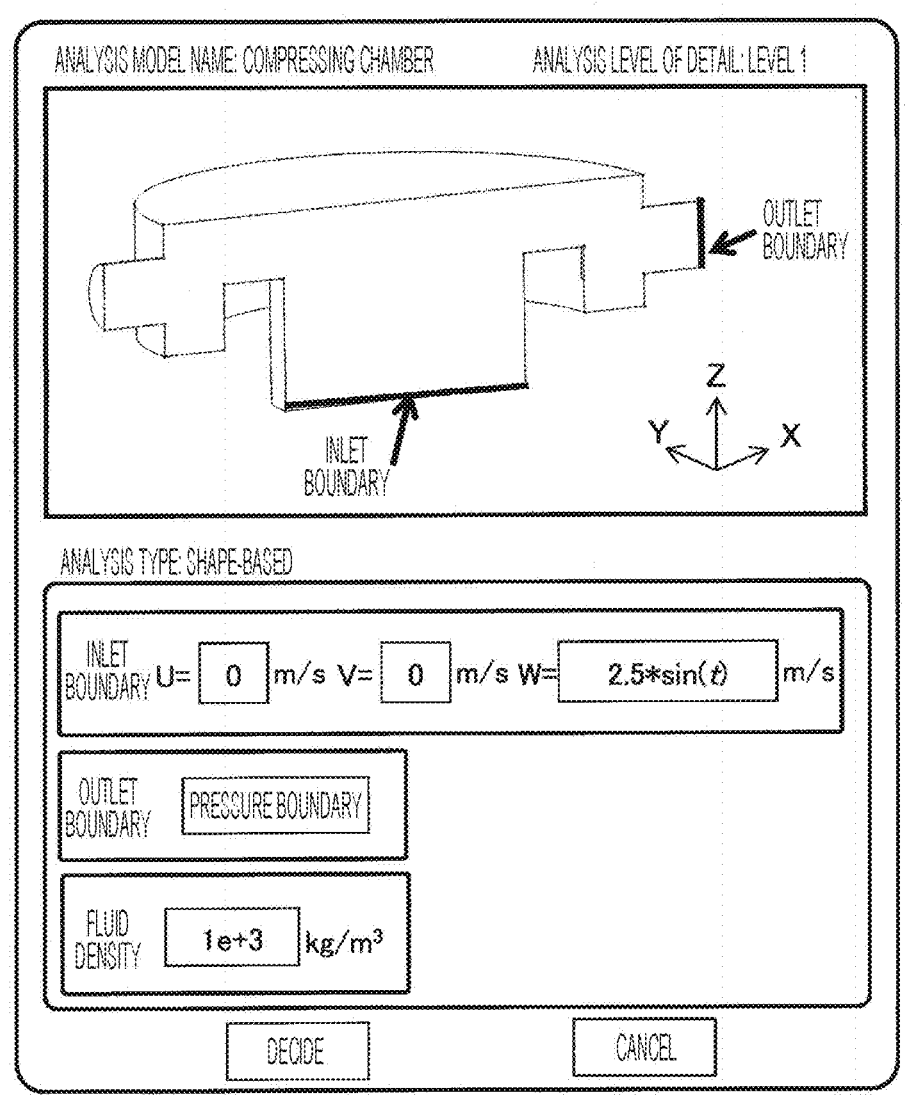
FIG. 12 is a diagram illustrating an example of an analysis condition input screen (1/6).

The analysis condition input/display unit 102 displays the analysis condition input screen. FIG. 12 is a diagram illustrating a configuration example of the analysis condition input screen for the level of detail 1 of the first analysis model (compressing chamber).

First, the operator inputs the analysis condition for the analysis using the input screen. Here, the flow path portion which is the three-dimensional model of the compressing chamber is input. Further, the analysis condition input/display unit 102 displays the analysis model name "compressing chamber," the analysis level of detail "level 1," and the analysis type "shape-based" which are input by the analysis model input/display unit 101. Here, the operator inputs an analysis condition for three-dimensional fluid analysis. An inlet boundary is input as a point which the fluid flows in, and an outlet boundary is input as a point which the fluid flows out. Further, as the analysis condition, in the inlet boundary, "0" m/s is input as a flow rate U in an x direction, "0" m/s is input as a flow rate V in a y direction, and "2.5*sin (t)" m/s is input as a flow rate W in a z direction. Here, "t"

indicates a progress time in the analysis. In the inlet boundary, the plunger originally performs the vertical motion, but it is replaced by giving the flow rate W periodically. Furthermore, a pressure boundary is input to the outlet boundary, and "1e+3" is input as a fluid density.

Figure 13:
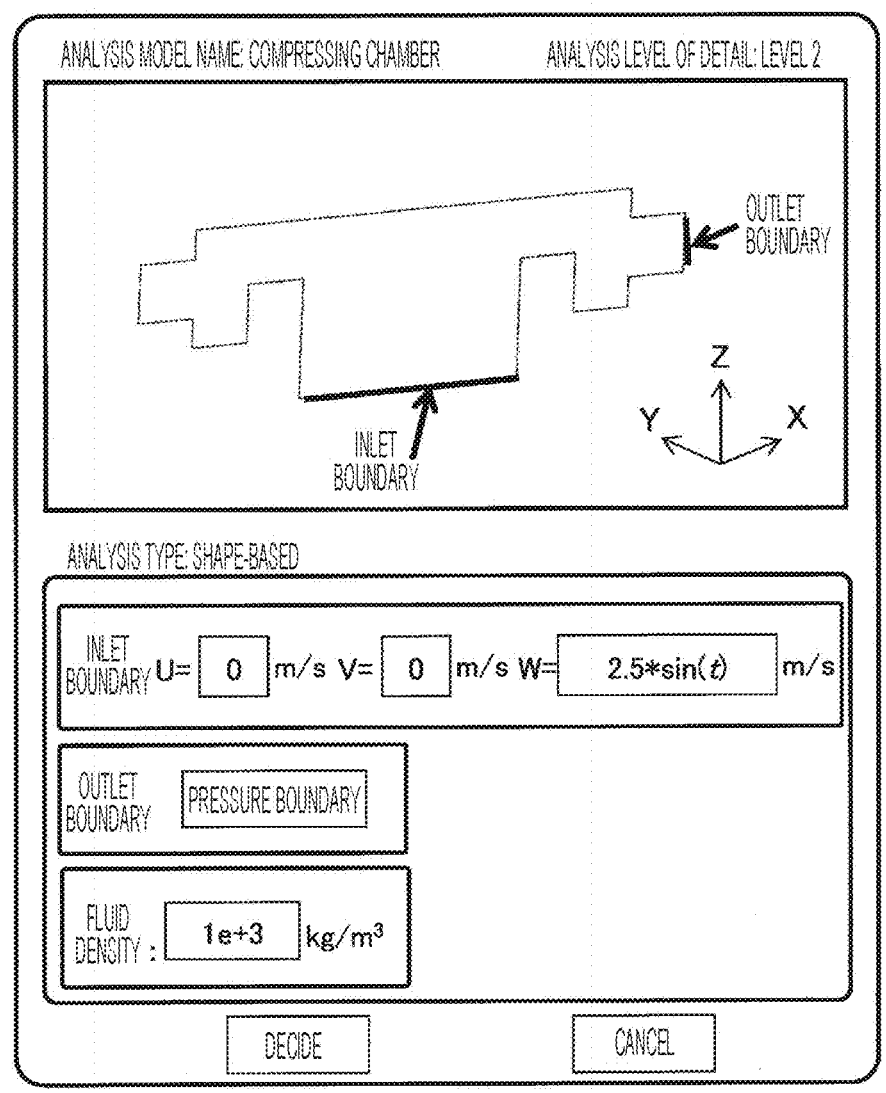
FIG. 13 is a diagram illustrating an example of an analysis condition input screen (2/6).

The operator then inputs the analysis condition for the analysis model of the analysis level of detail "level 2." FIG. 13 is a diagram illustrating a configuration example of an input screen for the level of detail 2 of the first analysis model (compressing chamber). The flow path model of the two-dimensional model of the compressing chamber is input. Further, the analysis model name "compressing chamber," the analysis level of detail "level 2," and the analysis type "shape-based" input by the analysis model input/display unit 101 are displayed. Here, the operator inputs the analysis condition for the two-dimensional fluid analysis. An inlet boundary is input as a point which the fluid flows in, and an outlet boundary is input as a point which the fluid flows out. Further, as the analysis condition, in the inlet boundary, "0" m/s is input as a flow rate U in an x direction, "0" m/s is input as a flow rate V in a y direction, and "2.5*sin(t)" m/s is input as a flow rate W in a z direction. A pressure boundary is input to the outlet boundary, and "1e+3" is input as a fluid density.

Figure 14:
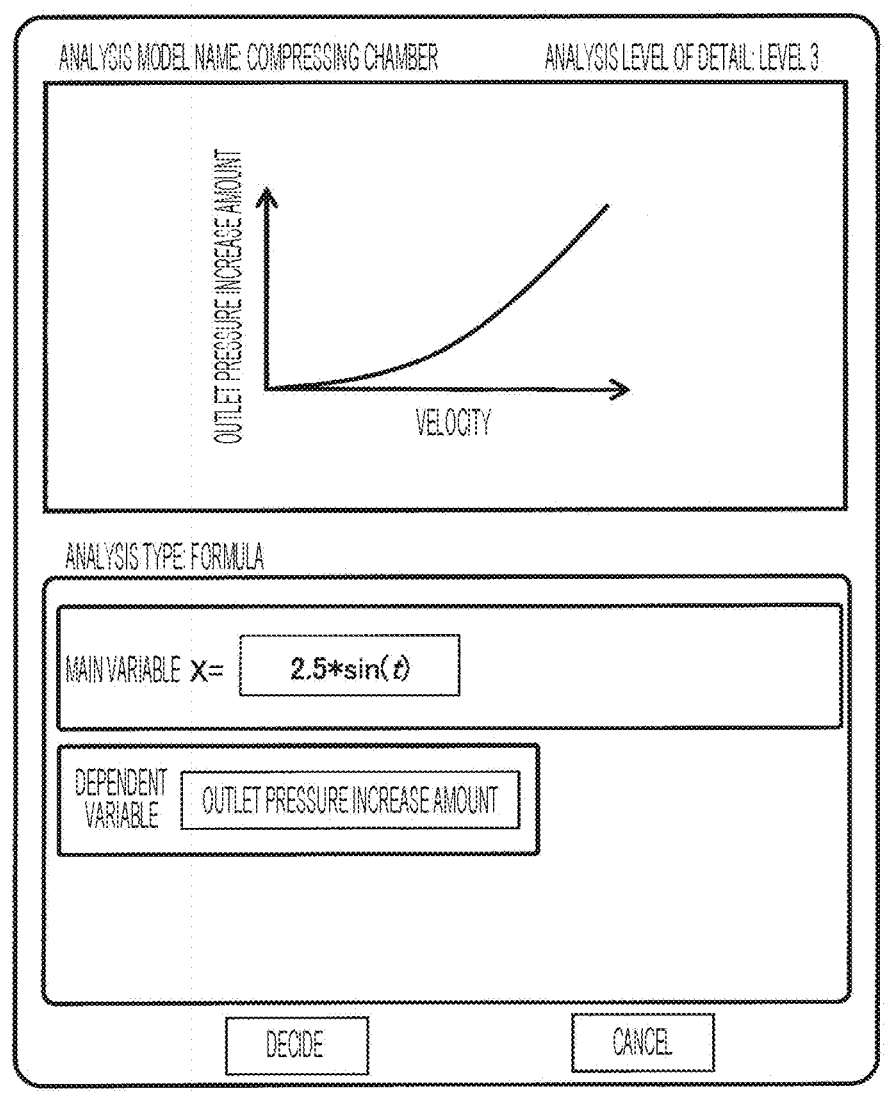
FIG. 14 is a diagram illustrating an example of an analysis condition input screen (3/6).

The operator finally inputs the analysis condition for the analysis model of the analysis level of detail "level 3." FIG. 14 is a diagram illustrating a configuration example of an input screen for the level of detail 3 of the first analysis model (compressing chamber). A relation between an outlet pressure increase amount of the compressing chamber and the velocity is input, and a graph visualized as the analysis model is displayed. Further, the analysis model name "compressing chamber," the analysis level of detail "level 3," and the analysis type "formula" input by the analysis model input/display unit 101 are displayed. In this case, the operator inputs an analysis condition for a calculation using a formula. "2.5*sin (t)" m/s is input as a main variable X which is an input value. The main variable indicates a plunger velocity, and a value based on the vertical motion of the plunger is input. Further, "outlet pressure increase amount" is input as the dependent variable which is an output value.

Figure 15:
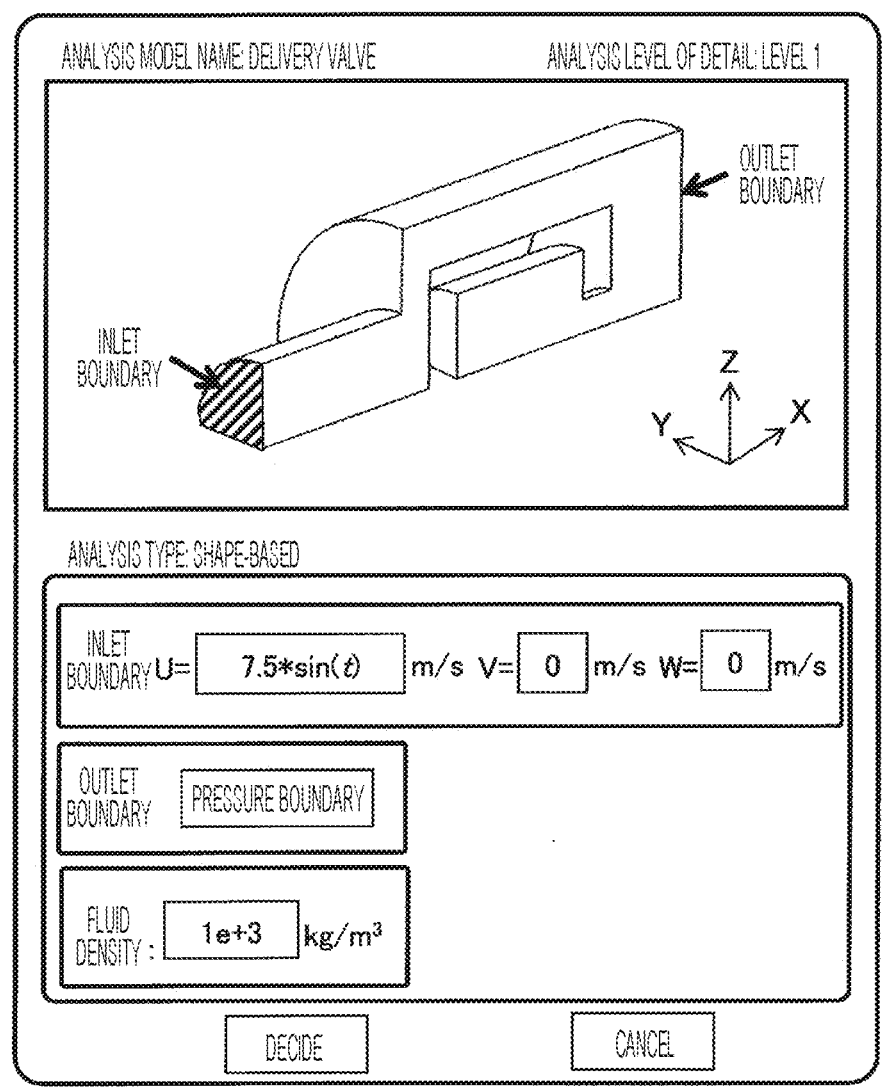
FIG. 15 is a diagram illustrating an example of an analysis condition input screen (4/6).

Similarly, the analysis condition for the delivery valve is also input. The operator first inputs an analysis condition for the analysis model of analysis level of detail "level 1." FIG. 15 illustrates an example of an input screen for the level of detail 1 of the second analysis model (delivery valve). Here, the flow path portion which is the three-dimensional model of the delivery valve is input. Further, the analysis model name "delivery valve," the analysis level of detail "level 1," and the analysis type "shape-based" input by the analysis model input/display unit 101 are displayed. The operator inputs the analysis condition for the three-dimensional fluid analysis. An inlet boundary is input as a point which the fluid flows in, and an outlet boundary is input as a point which the fluid flows out. Further, as the analysis condition, in the inlet boundary, "7.5*sin(t)" m/s is input as a flow rate U in an x direction, "0" m/s is input as a flow rate V in a y direction, and "0" m/s is input as a flow rate W in a z direction. The flow rate U is periodically given to the inlet boundary on the basis of the vertical motion of the plunger. A pressure boundary is input to the outlet boundary, and "1e+3" is input as a fluid density.

Figure 16:
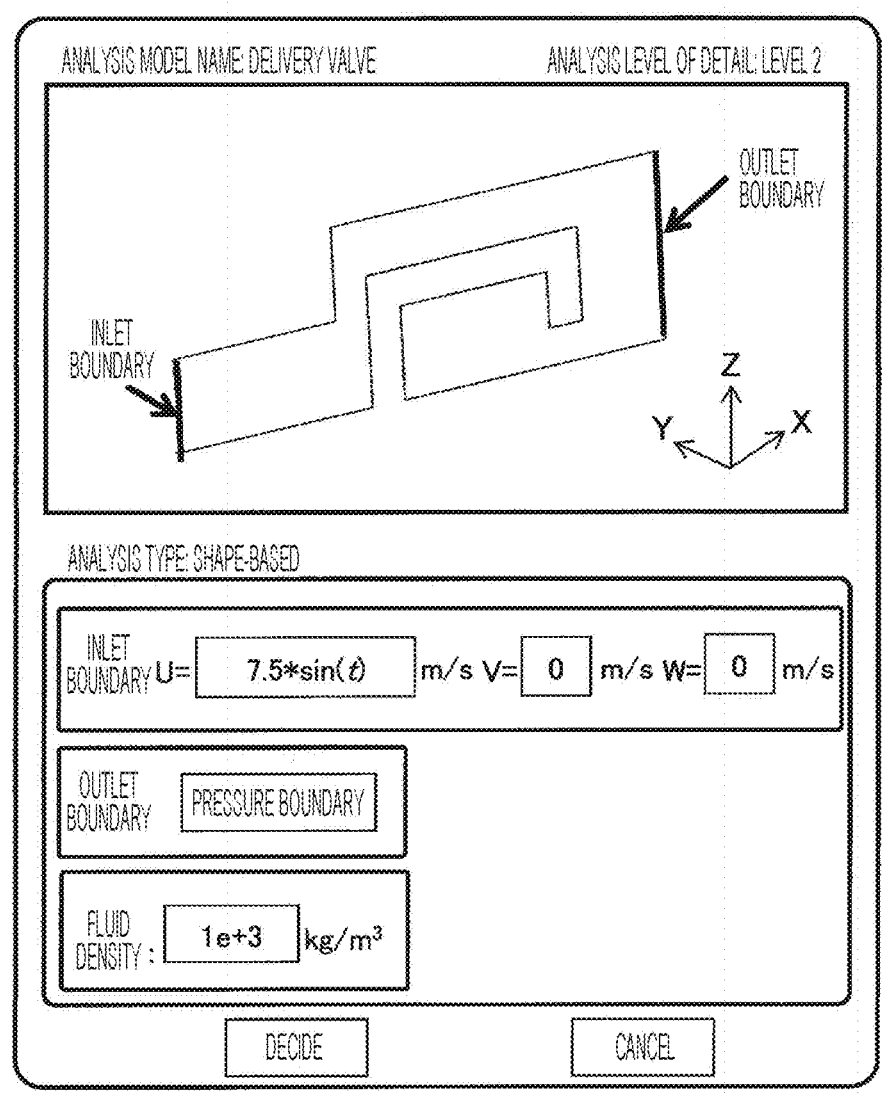
FIG. 16 is a diagram illustrating an example of an analysis condition input screen (5/6).

The operator then inputs the analysis condition for the analysis model of the analysis level of detail "level 2." FIG. 16 is a diagram illustrating a configuration example of an input screen for the level of detail 2 of the second analysis model (delivery valve). Here, the flow path portion which is the two-dimensional model of the delivery valve is input. Further, the analysis model name "delivery valve," the analysis level of detail "level 2," and the analysis type "shape-based" input by the analysis model input/display unit 101 are displayed. The operator inputs the analysis condition for two-dimensional fluid analysis. An inlet boundary is input as a point which the fluid flows in, and an outlet boundary is input as a point which the fluid flows out. Further, similarly to the level 1, as the analysis condition, in the inlet boundary, "7.5*sin(t)" m/s is input as a flow rate U in an x direction, "0" m/s is input as a flow rate V in a y direction, and "0" m/s is input as a flow rate W in a z direction. A pressure boundary is input as the outlet boundary. "1e+3" is input as a fluid density.

Figure 17:
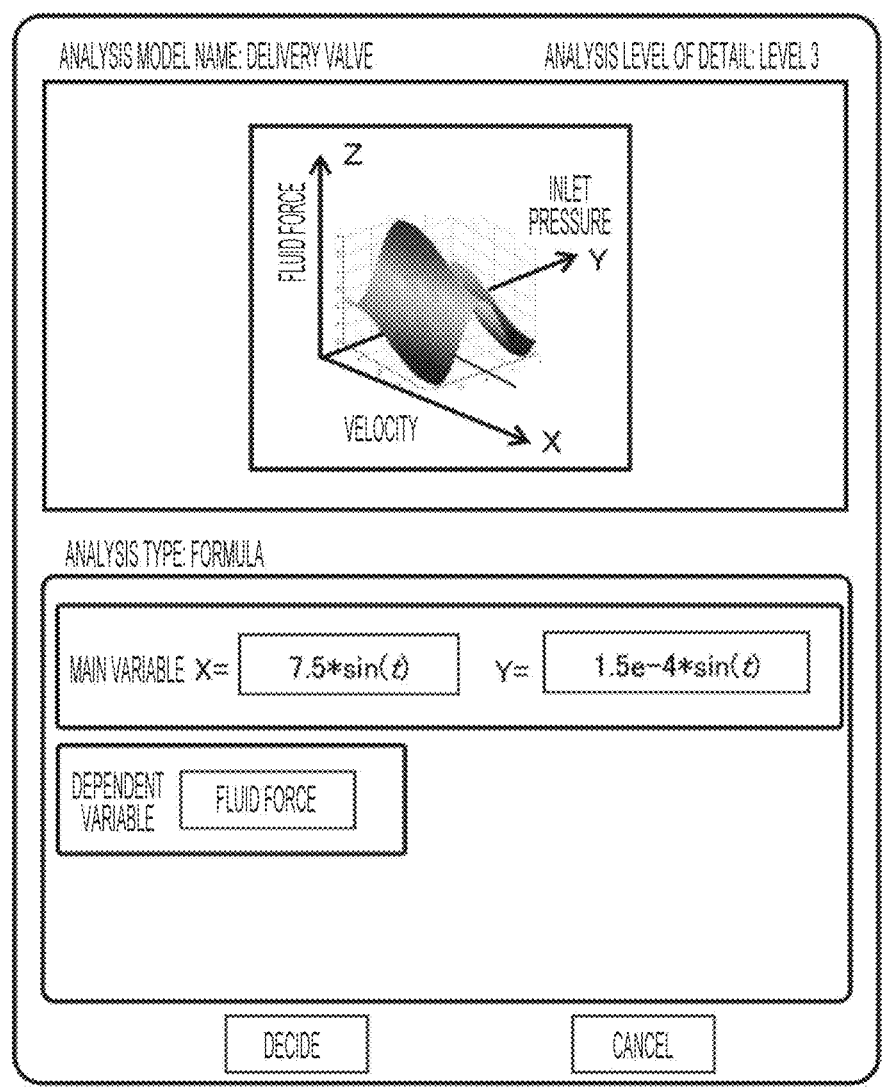
FIG. 17 is a diagram illustrating an example of an analysis condition input screen (6/6).

The operator finally inputs the analysis condition for the analysis model of the analysis level of detail "level 3." FIG. 17 is a diagram illustrating a configuration example of an input screen for the level of detail 3 of the second analysis model (delivery valve). The approximation formula of the delivery valve is input, and a graph visualized as an analysis model is displayed. Further, the analysis model name "delivery valve," the analysis level of detail "level 3," and the analysis type "formula" input by the analysis model input/display unit 101 are displayed. Here, the operator inputs the analysis condition for a calculation of the approximation formula. "7.5*sin(t)" m/s is input as the main variable X which is an input value, and "1.5e−4*sin(t)" m/s is input as Y. The main variable indicates a velocity (flow rate) and a delivery valve inlet pressure, and a value based on the vertical motion of the plunger is input. Further, "fluid force" is input as the dependent variable which is an output value. An order in which the analysis conditions are input in S201 is a random order.

(vi) Step 203

The analysis condition input/display unit 102 acquires the analysis condition information such as the boundary condition information input in S202.

(vii)

The analysis condition input/display unit 102 inputs the information obtained in S203 to the database 107.

(B) Phase 2

The phase 2 includes an analysis process of generating the analysis model on the basis of the analysis condition and analyzing individual components (S300) and a process of calculating the analysis accuracy from the difference of the analysis results of the individual components and calculating a relation between the analysis accuracy and the analysis time for executing the multi-objective optimization calculation using the analysis time and the analysis accuracy (S400). The multi-objective optimization calculation is an example, and combinations of the components may be comprehensively calculated, an integrated analysis result may be acquired, and the relation between the analysis accuracy and the analysis time may be acquired.

(i) Step 301

The analysis model generation/analysis control unit 103 acquires the information input by the analysis model input/display unit 101 and the analysis condition input/display unit 102 from the database 107.

(ii) Step 302

The analysis model generation/analysis control unit 103 constructs the analysis model on the basis of the input analysis level of detail and the analysis condition in the analysis object of an individual component. In the analysis model name "compressing chamber," three analysis models of the analysis levels of detail "level 1," "level 2," and "level 3" are generated. Similarly, in the analysis model name "delivery valve," three analysis models of the analysis levels of detail "level 1," "level 2," and "level 3" are generated. Here, a total of six analysis models are generated. At this time, in the analysis models of the compressing chamber and the delivery valve, meshes may be generated for a two-dimensional model and a three-dimensional model.

(iii) Step 303

The analysis model generation/analysis control unit 103 performs the analysis calculation on the generated analysis models of the respective components. Here, the analysis is performed on a total of six analysis models of the analysis levels of detail "level 1," "level 2," and "level 3" of the compressing chamber and the delivery valve.

(iv) Step 304

The analysis model generation/analysis control unit 103 determines whether or not the analysis of all the analysis levels of detail ends. When the analysis ends, the process proceeds to S305. When the analysis does not end, the process proceeds to S302. Here, it is determined whether or not the three types of analysis of the analysis levels of detail "level 1," "level 2," and "level 3" have been completed.

(v) Step 305

The analysis model generation/analysis control unit 103 determines whether or not analysis for all the components ends. When the analysis ends, the process proceeds to S306. When the analysis does not end, the process proceeds to S302. Here, it is determined whether the analysis for the two components of the compressing chamber and delivery valve ends.

(vi) Step 306

The analysis model generation/analysis control unit 103 inputs the analysis results into the database 107. Here, the outlet pressure increase amount and the analysis time are input to the database as the analysis results of the analysis levels of detail "level 1," "level 2," and "level 3" for the compressing chamber, and the fluid force and the analysis time are input to the database as the analysis results of the analysis levels of detail "level 1," "level 2," and "level 3" for the delivery valve.

(vii) Step 401

The analysis accuracy/analysis time relation calculating unit 104 displays a screen for checking a connection relation on the basis of the information obtained in S300, and further acquires all pieces of information input by the analysis model generation/analysis control unit 103. Here, the outlet pressure increase amount and the analysis time which are the analysis results of the analysis levels of detail "level 1," "level 2," and "level 3" for the compressing chamber and the fluid force and the analysis time which are the analysis results of the analysis levels of detail "level 1," "level 2," and "level 3" for the delivery valve are acquired.

(viii) Step 402

The analysis accuracy/analysis time relation calculating unit 104 calculates the difference of the results of the different analysis levels of detail in the analysis object of the identical component. Here, a difference or error between the analysis results of the analysis levels of detail on the basis of the highest analysis level of detail which is obtained by Formula (2) is defined as the analysis accuracy.

[Math. 2]

$$\frac{(Y - Y_{Level1})}{Y_{Level1}} \qquad (2)$$

Here, Y indicates the analysis result, and a subscript indicates the analysis level of detail. In this case, since level 1 is the highest analysis level of detail, the level 1 is used. Table 1 shows a calculation result. An input is the analysis level of detail serving as design variable, and the output is the error.

TABLE 1

| Analysis level of detail | Compressing chamber | | Delivery valve | |
|---|---|---|---|---|
| | Outlet pressure increase amount | error | Fluid force | error |
| Level 1 | 2.60E−03 | 0.00% | 23 | 0.00% |
| Level 2 | 2.56E−03 | 1.54% | 22.3 | 3.04% |
| Level 3 | 2.69E−03 | 3.46% | 20.1 | 12.61% |

(ix) Step 403

The analysis accuracy/analysis time relation calculating unit 104 determines whether or not an error (difference) calculation for all the components ends. When the calculation ends, the process proceeds to S404. When the calculation does not end, the process proceeds to S402. Here, the error (difference) from the analysis level of detail "level 1" is calculated for the components of the compressing chamber and the delivery valve.

(x) Step 404

The analysis accuracy/analysis time relation calculating unit 104 performs the multi-objective optimization calculation in which the analysis level of detail of the component is used as the design variable, and the error (difference) and the analysis time are used as the objective function. For a calculation of the objective function of the error (difference) and the analysis time, a sum of the errors (differences) corresponding to the analysis levels of detail selected for the respective components and a sum of the analysis times is obtained. In other words, when the analysis level of detail "level 2" is selected for the compressing chamber, and the analysis level of detail "level 3" is selected for the delivery valve, a sum of the error (difference) of the analysis level of detail "level 2" of the compressing chamber and the error (difference) of the analysis level of detail "level 3" of the delivery valve becomes the objective function of the error (difference), and a sum of the analysis time of the analysis level of detail "level 2" of the compressing chamber and the analysis time of the analysis level of detail "level 3" of the delivery valve becomes the objective function of the analysis time. For the multi-objective optimization calculation, an algorithm such as a genetic algorithm is used as an example.

(xi) Step 405

The analysis accuracy/analysis time relation calculating unit 104 inputs the error (difference) information and a result of the multi-objective optimization calculation calculated in S402 and S404 to the database 107. Here, the result of the multi-objective optimization calculation becomes information of a total sum of the errors (differences) and a total sum of the analysis times when the analysis level of detail is set for the respective components.

(C) Phase 3

The phase 3 includes an analysis level of detail decision process (S500) and an analysis calculation result display process (S600). In S500, when the analysis level of detail of each component is input, the analysis accuracy and the analysis time are predicted and displayed, a whole integrated analysis model in which the respective components are connected is constructed in response to the decision of the analysis level of detail of the operator, and the whole integrated analysis is performed. Further, in S600, the result of the whole integrated analysis is displayed.

(i) Step 501

The analysis level of detail input/prediction result display unit 105 acquires the information input by the analysis model input/display unit 101, the analysis condition input/display unit 102, and the analysis accuracy/analysis time relation calculating unit 104 from the database 107.

(ii) Step 502

Figure 18:
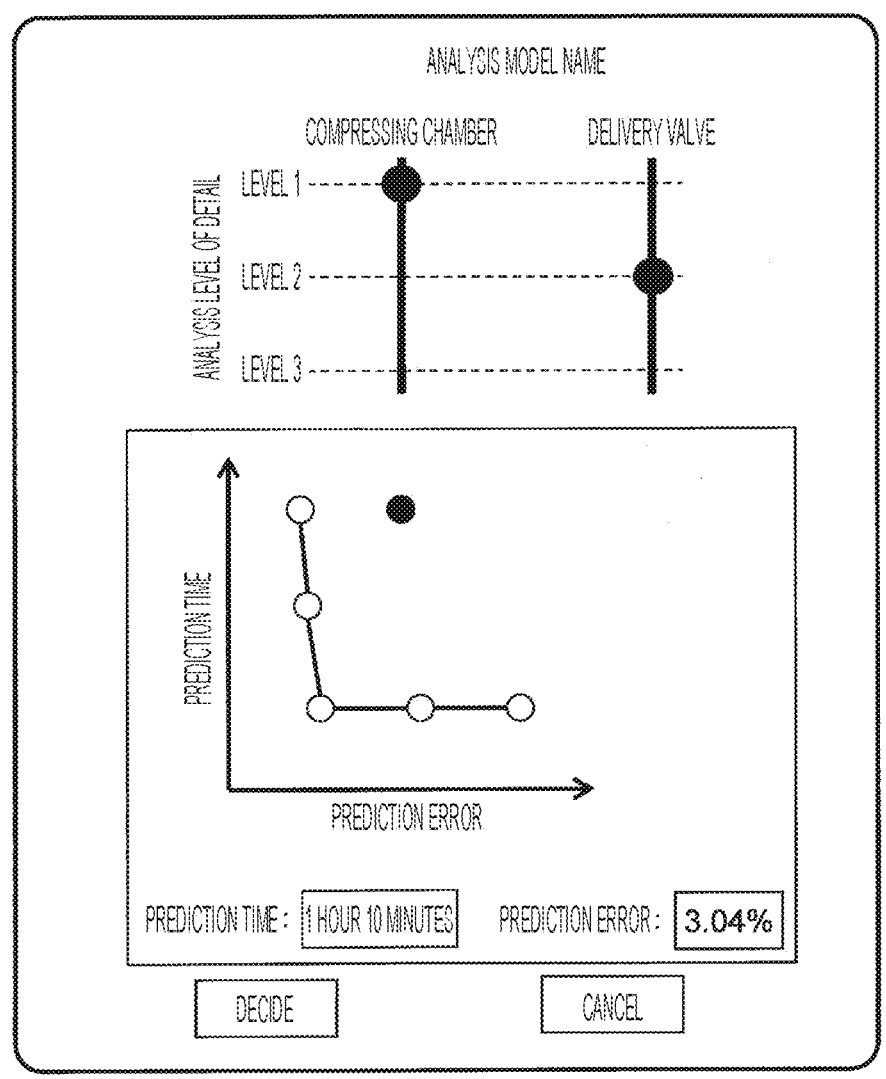
FIG. 18 is a diagram illustrating an example of an analysis level of detail input/prediction result display screen.

The analysis level of detail input/prediction result display unit 105 displays an analysis level of detail input/prediction result display screen. FIG. 18 is a diagram illustrating a configuration example of the analysis level of detail input/prediction result display screen.

The operator designates the level of the analysis level of detail of each component in order to perform the whole integrated analysis. The analysis level of detail input/prediction result display unit 105 displays the predicted calculation time and error in response to the designation. In FIG. 18, the analysis model names "compressing chamber" and "delivery valve" which are the components are displayed so that the respective analysis level of detail can be set. Here, the analysis level of detail "level 1" of the compressing chamber and the analysis level of detail "level 2" of the delivery valve are designated. A graph I which a vertical axis indicates a prediction time, and a horizontal axis indicates a prediction error is also displayed. Here, the multi-objective optimization calculation result obtained in S404 is displayed. In FIG. 18, white circles indicate the multi-objective optimization calculation result. Further, in FIG. 18, a black circle indicates the prediction time and the prediction error selected by the operator at an upper part of FIG. 18. A prediction time and a prediction error corresponding to the selection of the operator are displayed in a prediction time field and a prediction error field. Here, the prediction time of 1 hour 10 minutes and the prediction error of 3.04% are displayed. Further, when the operator selects the white circle of the multi-objective optimization calculation result, the analysis level of detail, the prediction time, and the prediction error obtained by the multi-objective optimization calculation can be also displayed.

(iii) Step 503

The analysis model generation/analysis control unit 103 generates the whole integrated analysis model in accordance with the analysis level of detail designated in S502. If a case in which the analysis level of detail "level 1" is input for the compressing chamber and the analysis level of detail "level 2" is input for the delivery valve as illustrated in FIG. 18 is described as an example, the whole integrated analysis model is generated when the operator pushes a button "decide." Here, the analysis model in which the compressing chamber and the delivery valve are linked is generated using the three-dimensional analysis for the compressing chamber and the two-dimensional analysis model for the delivery valve.

(iv) Step 504

The analysis model generation/analysis control unit 103 performs the whole integrated analysis on the whole analysis object in which the respective components are combined. Here, the analysis in which the compressing chamber and the delivery valve are linked is performed using the three-dimensional analysis for the compressing chamber and the two-dimensional analysis model for the delivery valve.

(v) Step 505

The analysis model generation/analysis control unit 103 acquires the analysis result obtained in S504 and inputs the analysis result into the database 107.

(vi) Step 601

Figure 19:
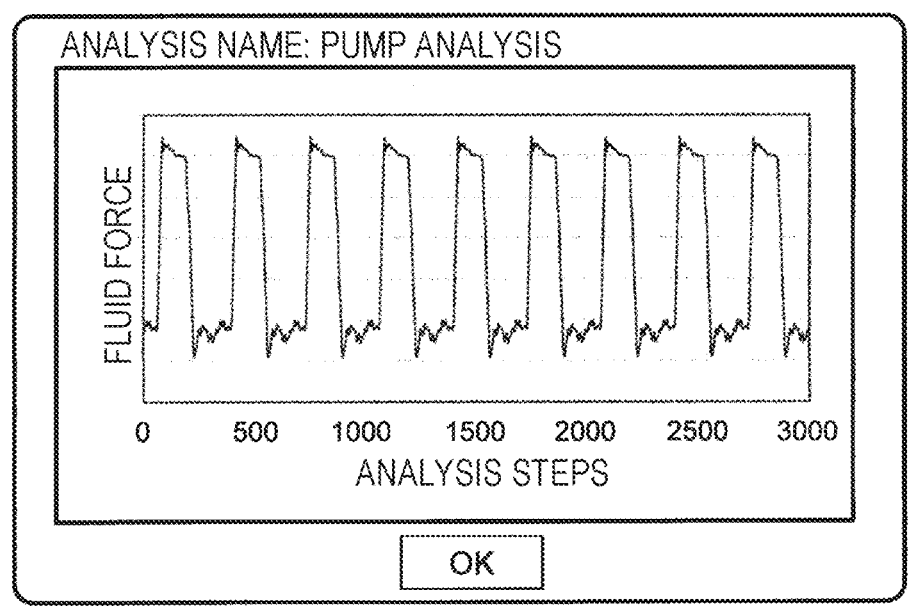
FIG. 19 is a diagram illustrating an example of an analysis result display screen.

The analysis result display unit 106 displays the result of the whole integrated analysis analyzed by the analysis model generation/analysis control unit 103. FIG. 19 is a diagram illustrating a configuration example of a display screen of displaying the whole integrated analysis result. In FIG. 19, an analysis result when a horizontal axis indicates analyzing steps, and a vertical axis indicates fluid force applied to the delivery valve.

CONCLUSION (i) In the embodiment of the present invention, the prediction analysis error and the prediction analysis time of the analysis object are presented, the operator understands the analysis error and the prediction analysis time in advance, and then the integrated analysis model of the whole analysis object is generated. When the model is generated, since the simulation is performed several times thereafter, the processing time can be reduced. On the other hand, in the generation of the integrated analysis model of the related art, since a combination of the analysis levels of detail of respective parts is decided without a firm basis (in accordance with intuition and experience of the operator), it is unclear whether it takes time to analyze or an analysis time is reduced. If the analysis levels of detail of all parts are decreased, it does not take time, but the analysis accuracy gets worse. In the present embodiment, it is possible to integrate and analyze the whole analysis object in view of the balance between the analysis time and the analysis accuracy.

In the present embodiment, the analysis prediction time and the analysis prediction accuracy when the whole integrated analysis for the analysis object is performed are calculated using the acquired analysis results corresponding to a plurality of analysis levels of detail of a plurality of components, and the analysis prediction time and the analysis prediction accuracy corresponding to a designated combination of analysis levels of detail of a plurality of components are output. In other words, the analysis models of different analysis levels of detail of the same analysis object are extracted, analysis for the single component is performed, and the analysis accuracy and the analysis time are calculated (the analysis time and the analysis accuracy are calculated from the analysis result for the high level of detail and the analysis result for the low level of detail) and held in the database. Accordingly, the analysis accuracy prediction and the analysis time prediction for the whole system can be performed, and the analysis level of detail of the individual analysis model of the whole system is decided in accordance with a target analysis accuracy and a target analysis time, and thus it is possible to implement the improvement in the analysis accuracy and the reduction in the analysis time.

In the present embodiment, the number of components is two, and the number of components may be arbitrary. In the present embodiment, the polynomial is used as the approximation formula, but a response surface model such as a lookup table or a neural network may be input. Furthermore, in the present embodiment, the analysis for the respective analysis region is described as being performed in the same computer but may be performed in different computers using a network environment. (ii) The present embodiment can also be realized by a software program code of implementing the respective functions. In this case, a storage medium including the program code stored therein is provided to a system or a device, and a computer (or a CPU or a MPU) of the system or the device reads the program code stored in the storage medium. In this case, the program code read from the storage medium realizes the functions of the above-described embodiment, and the program code and the storage medium including the program code stored therein constitute the present invention. Examples of the storage medium for supplying the program code include a floppy disk, a CD-ROM, a DVD-ROM, a hard disk, an optical disk, a magneto-optical disk, a CD-R, a magnetic tape, a non-volatile memory card, and a ROM.

An operating system (OS) or the like operating on a computer may perform some or all of the actual processes on the basis of an instruction of the program code so that the functions of the above-described embodiment described above are implemented by the processes. Furthermore, the program code read from the storage medium may be written in a memory of the computer, and then the CPU or the like of the computer may perform some or all of the actual processes on the basis of an instruction of the program code so that the functions of the above-described embodiment are implemented by the processes.

Furthermore, a program code of software for implementing the functions of the embodiment may be delivered via a network and stored in a storage device such as a hard disk or a memory of the system or the device or a storage medium such as a CD-RW or a CD-R, and the computer (or CPU or MPU) of the system or the device may read and execute the program code stored in the storage device or the storage medium at the time of use.

Finally, it should be noted that the processes and the techniques described here are not inherently related to any particular device and can be implemented by any suitable combination of components. Further, various types of general-purpose devices can be used in accordance with instructions described herein. It may be found to be beneficial in constructing a dedicated device to perform steps of the method described here. Further, various inventions can be made by appropriately combining a plurality of constituent elements disclosed in the embodiment. For example, some components may be deleted from all the components described in the embodiment. Further, constituent elements described in different embodiments may be appropriately combined. The present invention has been described focusing on the specific examples, but these examples are not for limitation in all respects but for description. Persons skilled in the art will appreciate that there are numerous combinations of hardware, software, and firmware corresponding to the implementation of the present invention. For example, software described above can be implemented in a wide range of program or scripting languages such as assembler, C/C++, perl, Shell, PHP, and Java (a registered trademark).

Furthermore, in the above-described embodiment, a control line or an information line are illustrated since they are necessary for description, and all control lines or information lines necessary in a product are not necessarily illustrated. All the components may be connected to one another.

REFERENCE SIGNS LIST 101 analysis model input/display unit
102 analysis condition input/display unit
103 analysis model generation/analysis control unit
104 analysis accuracy/analysis time relation calculating unit
105 analysis level of detail input/prediction result display unit
106 analysis result display unit
107 database
108 computer

The invention claimed is:

1. A whole integrated analysis model assist device that assists whole integrated analysis for an analysis object constituted by a plurality of components, the whole integrated analysis model assist device comprising:
　a memory that stores various kinds of programs for executing whole integrated analysis model assist; and
　a processor that performs a process of reading the various kinds of programs from the memory and generating information for assisting the whole integrated analysis for the analysis object,
　wherein the processor performs
　　a process of acquiring analysis results corresponding to a plurality of analysis levels of detail for the plurality of components from a database,
　　a process of calculating, when the whole integrated analysis for the analysis object is performed, an analysis prediction time and an analysis prediction accuracy using the analysis results corresponding to the plurality of analysis levels of detail of the plurality of components, and
　　a process of outputting the analysis prediction time and the analysis prediction accuracy corresponding to a designated combination of the analysis levels of detail of the plurality of components.

2. The whole integrated analysis model assist device according to claim 1,
　wherein the processor calculates a difference of the analysis result between different analysis levels of detail in the same component as the analysis accuracy for each of the plurality of components and calculates the analysis prediction accuracy using the analysis result between the different analysis levels of detail in the same component.

3. The whole integrated analysis model assist device according to claim 2,
　wherein, in the process of calculating the analysis prediction time and the analysis prediction accuracy, the processor calculates the analysis prediction time and the analysis prediction accuracy by performing a multi-objective optimization calculation using the analysis level of detail of the component as a design variable, and the analysis accuracy of the component and an analysis time of the component included in the analysis result as an objective function.

4. The whole integrated analysis model assist device according to claim 1,
　wherein the processor further performs a process of receiving designation of the analysis level of detail for each of the plurality of components, generating an analysis model for the analysis object on the basis of the designated analysis level of detail, and performing the whole integrated analysis for the analysis object.

5. The whole integrated analysis model assist device according to claim 1,
　wherein the processor acquires analysis models corresponding to the plurality of analysis levels of detail of the plurality of components and analysis conditions of the plurality of components from the database, performs analysis in accordance with the plurality of analysis levels of detail of each of the plurality of components, and stores analysis results corresponding to the plurality of analysis levels of detail in the database for the plurality of components.

6. A whole integrated analysis model assist method of assisting whole integrated analysis for an analysis object constituted by a plurality of components, the whole integrated analysis model assist method comprising:

a step of acquiring, by a processor that performs a process of reading various kinds of programs for executing whole integrated analysis model assist from a memory that stores the various kinds of programs and generating information for assisting the whole integrated analysis for the analysis object, analysis results corresponding to a plurality of analysis levels of detail for the plurality of components from a database;

a step of calculating, by the processor when the whole integrated analysis for the analysis object is performed, an analysis prediction time and an analysis prediction accuracy using the analysis results corresponding to the plurality of analysis levels of detail of the plurality of components; and a step of outputting, by the processor, the analysis prediction time and the analysis prediction accuracy corresponding to a designated combination of the analysis levels of detail of the plurality of components.

7. The whole integrated analysis model assist method according to claim 6, wherein the processor calculates a difference of the analysis result between different analysis levels of detail in the same component as the analysis accuracy for each of the plurality of components and calculates the analysis prediction accuracy using the analysis result between the different analysis levels of detail in the same component.

8. The whole integrated analysis model assist method according to claim 7, wherein, in the step of calculating the analysis prediction time and the analysis prediction accuracy, the processor calculates the analysis prediction time and the analysis prediction accuracy by performing a multi-objective optimization calculation using the analysis level of detail of the component as a design variable, and the analysis accuracy of the component and an analysis time of the component included in the analysis result as an objective function.

9. The whole integrated analysis model assist method according to claim 6, further comprising a step of receiving, by the processor, designation of the analysis level of detail for each of the plurality of components, generating an analysis model for the analysis object on the basis of the designated analysis level of detail, and performing the whole integrated analysis for the analysis object.

10. The whole integrated analysis model assist method according to claim 6, further comprising a step of acquiring, by the processor, analysis models corresponding to the plurality of analysis levels of detail of the plurality of components and analysis conditions of the plurality of components from the database, performing analysis in accordance with the plurality of analysis levels of detail of each of the plurality of components, and storing analysis results corresponding to the plurality of analysis levels of detail in the database for the plurality of components.

* * * * *